US008659987B2

(12) United States Patent
Hartman, Jr.

(10) Patent No.: US 8,659,987 B2
(45) Date of Patent: *Feb. 25, 2014

(54) ADAPTIVE MODULATION FOR FIXED WIRELESS LINK IN CABLE TRANSMISSION SYSTEM

(75) Inventor: David L. Hartman, Jr., Irvine, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/206,183

(22) Filed: Aug. 9, 2011

(65) Prior Publication Data
US 2011/0292829 A1 Dec. 1, 2011

Related U.S. Application Data

(63) Continuation of application No. 12/654,816, filed on Jan. 5, 2010, now Pat. No. 8,023,396, which is a continuation of application No. 11/261,234, filed on Oct. 27, 2005, now Pat. No. 7,706,246, which is a continuation of application No. 09/858,926, filed on May 15, 2001, now Pat. No. 7,016,296.

(60) Provisional application No. 60/241,046, filed on Oct. 16, 2000.

(51) Int. Cl.
H04J 9/00 (2006.01)
H04B 7/208 (2006.01)
H04L 27/30 (2006.01)
H04W 72/00 (2009.01)

(52) U.S. Cl.
USPC ........... 370/204; 370/207; 370/344; 375/260; 375/262; 375/341; 455/452.2

(58) Field of Classification Search
USPC .......... 370/204, 207, 344; 375/260, 262, 341; 455/452.2
See application file for complete search history.

(56) References Cited

U.S. PATENT DOCUMENTS 4,891,806 A 1/1990 Farias et al.
5,119,403 A 6/1992 Krishnan
(Continued)

FOREIGN PATENT DOCUMENTS

EP 0 490 551 A2 6/1992
EP 0 991 220 A2 4/2000
(Continued)

OTHER PUBLICATIONS

Webb, William and Hanzo, Lajos, "Variable Rate QAM [1], Modern Quadrature Amplitude Modulation, Principles and Applications for Fixed and Wireless Communications," *IEEE Press*, Chapter 13, pp. 384-405, New York, United States (1994).

Primary Examiner — Alpus H Hsu
(74) Attorney, Agent, or Firm — Sterne, Kessler, Goldstein & Fox P.L.L.C.

(57) ABSTRACT

In one embodiment of a communications network, the predetermined encoding scheme and symbol constellation configurations are chosen so that the range in channel qualities that the encoding scheme and symbol constellation configurations are designed to be utilized within overlap with each other. This overlapping provides hysteresis, which reduces the frequency with which a subscriber must alter encoding scheme and symbol constellations. Reducing the frequency of changing encoding scheme and/or symbol constellation eliminates the communication overhead associated with these changes and increases throughput by enabling the subscriber to spend more time transmitting data.

14 Claims, 14 Drawing Sheets

(56) References Cited

U.S. PATENT DOCUMENTS

| | | |
|---|---|---|
| 5,185,763 A | 2/1993 | Krishnan |
| 5,204,874 A | 4/1993 | Falconer et al. |
| 5,222,077 A | 6/1993 | Krishnan |
| 5,323,421 A | 6/1994 | LaRosa et al. |
| 5,351,274 A | 9/1994 | Chennakeshu et al. |
| 5,416,801 A | 5/1995 | Chouly et al. |
| 5,436,930 A | 7/1995 | Bremer et al. |
| 5,442,626 A | 8/1995 | Wei |
| 5,541,955 A | 7/1996 | Jacobsmeyer |
| 5,581,578 A | 12/1996 | De Bot |
| 5,598,435 A | 1/1997 | Williams |
| 5,666,170 A | 9/1997 | Stewart |
| 5,671,253 A | 9/1997 | Stewart |
| 5,703,902 A | 12/1997 | Ziv et al. |
| 5,790,570 A | 8/1998 | Heegard et al. |
| 5,796,716 A | 8/1998 | Smith |
| 5,799,242 A | 8/1998 | Sano |
| 5,809,083 A | 9/1998 | Wright |
| 5,828,695 A | 10/1998 | Webb |
| 5,859,877 A | 1/1999 | Betts et al. |
| 5,946,356 A | 8/1999 | Felix et al. |
| 5,970,098 A | 10/1999 | Herzberg |
| 6,005,897 A | 12/1999 | McCallister et al. |
| 6,028,843 A * | 2/2000 | Delp et al. .................... 370/235 |
| 6,108,374 A | 8/2000 | Balachandran et al. |
| 6,141,387 A | 10/2000 | Zhang |
| 6,144,651 A | 11/2000 | Rinchiuso et al. |
| 6,167,031 A | 12/2000 | Olofsson et al. |
| 6,198,734 B1 | 3/2001 | Edwards et al. |
| 6,212,240 B1 | 4/2001 | Scheibel, Jr. et al. |
| 6,215,827 B1 | 4/2001 | Balachandran et al. |
| 6,298,092 B1 | 10/2001 | Heath et al. |
| 6,310,909 B1 | 10/2001 | Jones |
| 6,385,462 B1 | 5/2002 | Baum et al. |
| 6,430,228 B1 | 8/2002 | Zhang |
| 6,442,164 B1 * | 8/2002 | Wu ........................ 370/395.21 |
| 6,449,246 B1 | 9/2002 | Barton et al. |
| 6,477,167 B1 * | 11/2002 | Wu ........................ 370/395.21 |
| 6,490,270 B1 | 12/2002 | Krishnamoorthy et al. |
| 6,553,063 B1 | 4/2003 | Lin et al. |
| 6,553,518 B1 | 4/2003 | Ware et al. |
| 6,614,861 B1 | 9/2003 | Terry et al. |
| 6,621,857 B1 | 9/2003 | Belotserkovsky et al. |
| 6,625,165 B1 | 9/2003 | Krishnamoorthy et al. |
| 6,636,500 B2 | 10/2003 | Krishnamoorthy et al. |
| 6,650,624 B1 | 11/2003 | Quigley et al. |
| 6,654,431 B1 | 11/2003 | Barton et al. |
| 6,707,856 B1 | 3/2004 | Gardner et al. |
| 6,769,090 B1 | 7/2004 | Halder |
| 6,804,211 B1 | 10/2004 | Klein et al. |
| 6,845,082 B2 | 1/2005 | Bourget et al. |
| 6,889,355 B1 | 5/2005 | Calderbank et al. |
| 6,904,082 B2 | 6/2005 | Jones |
| 6,922,445 B1 | 7/2005 | Sampath et al. |
| 6,934,317 B1 | 8/2005 | Dent |
| 6,980,511 B1 * | 12/2005 | Li et al. ........................ 370/230 |
| 7,016,296 B2 | 3/2006 | Hartman, Jr. |
| 7,068,628 B2 | 6/2006 | Li et al. |
| 7,443,830 B2 * | 10/2008 | Engels et al. ................. 370/347 |
| 7,706,246 B2 | 4/2010 | Hartman, Jr. |
| 2002/0181571 A1 | 12/2002 | Yamano et al. |

FOREIGN PATENT DOCUMENTS

| | | |
|---|---|---|
| WO | WO 00/27085 A1 | 5/2000 |
| WO | WO 00/28712 A2 | 5/2000 |
| WO | WO 02/33875 A1 | 4/2002 |

* cited by examiner

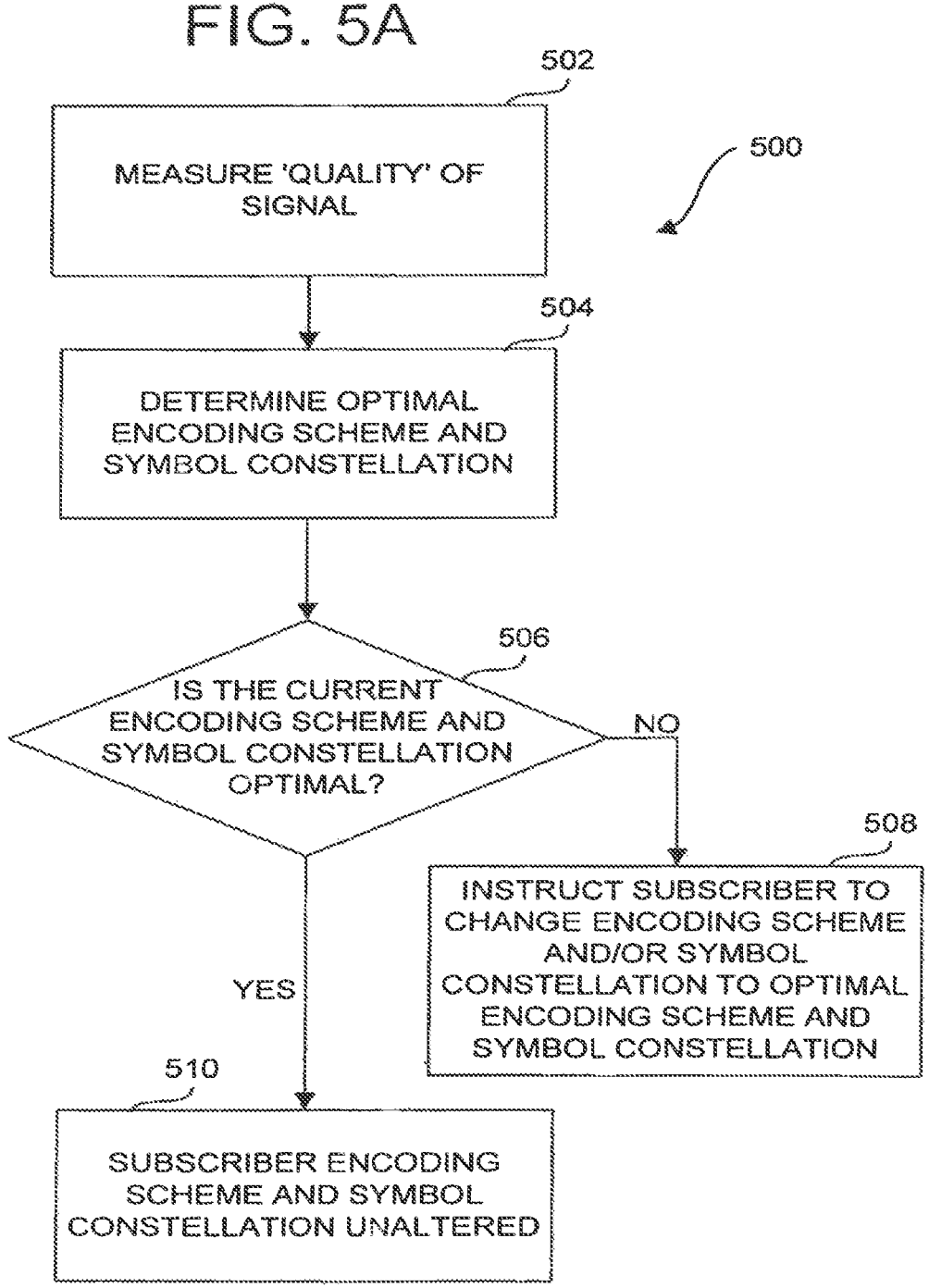

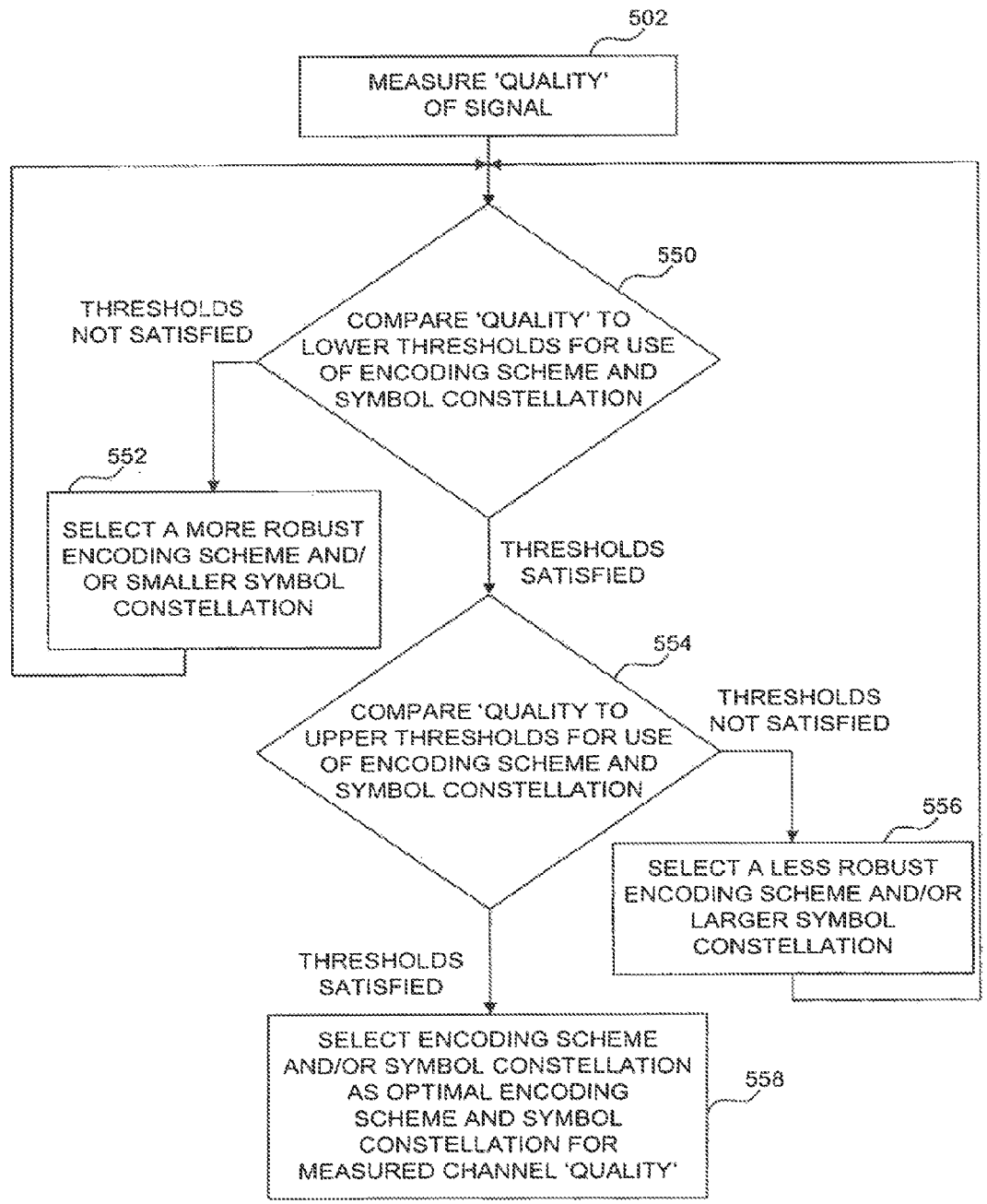

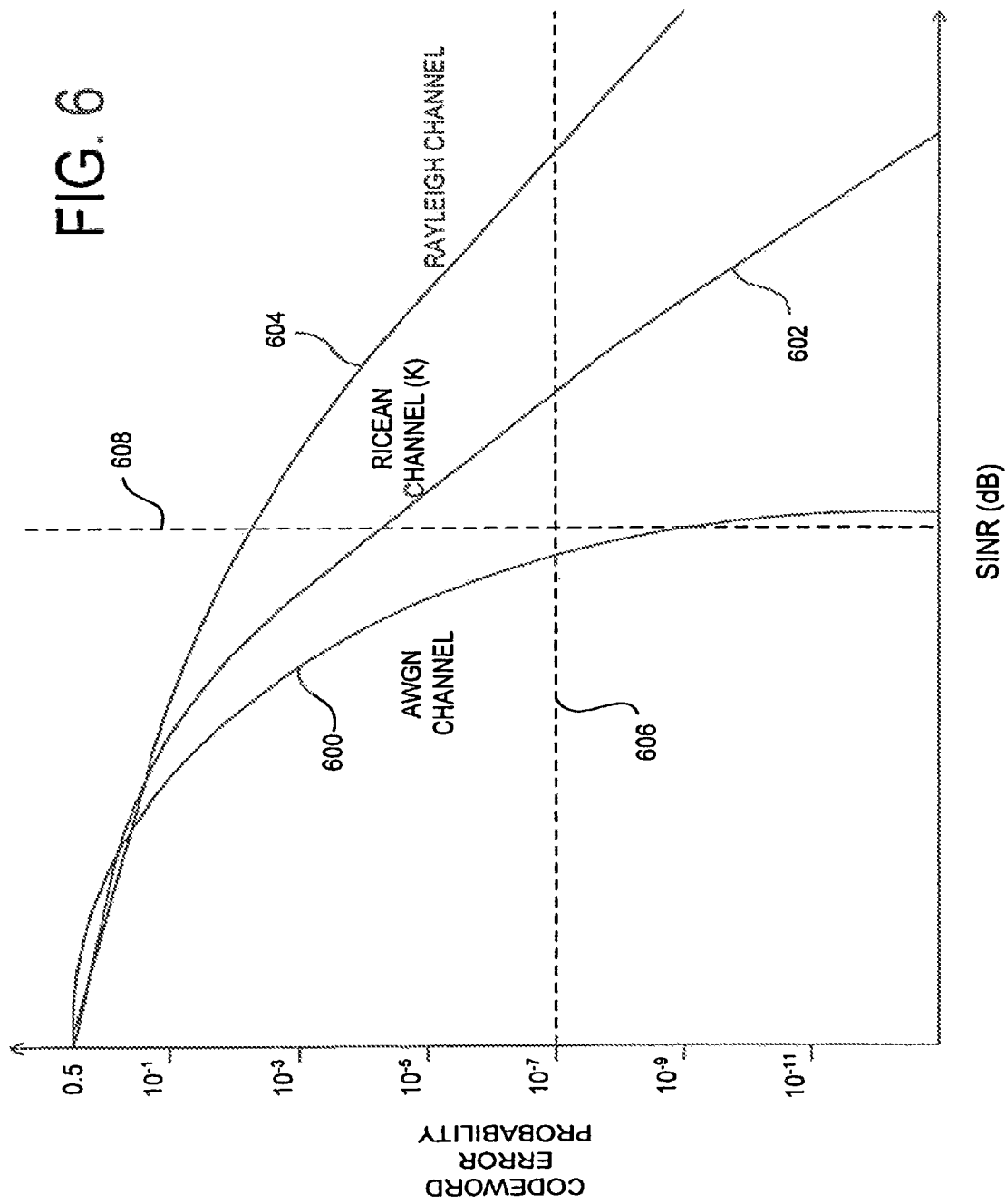

ADAPTIVE MODULATION FOR FIXED WIRELESS LINK IN CABLE TRANSMISSION SYSTEM

CROSS-REFERENCE TO RELATED APPLICATIONS

This application is a continuation of application Ser. No. 12/654,816, filed Jan. 5, 2010, now U.S. Pat. No. 8,023,396, which is continuation of application Ser. No. 11/261,234, filed Oct. 27, 2005, now U.S. Pat. No. 7,706,246, which is a continuation of application Ser. No. 09/858,926, filed May 15, 2001, now U.S. Pat. No. 7,016,296 which claimed the benefit of provisional Application No. 60/241,046, filed Oct. 16, 2000, the disclosures of which are incorporated herein by reference.

FIELD OF THE INVENTION

This invention relates generally to communication systems and more specifically to adaptive modulation in a fixed wireless communication system.

BACKGROUND

The growth of digital communications has created an increased demand for broadband communications infrastructure. A significant component of the cost of creating this infrastructure is the cost of providing fixed cabling in the Customer Access Network ("CAN"). A method of reducing the cost of a broadband CAN is to use fixed broadband wireless to provide communication links between subscribers and a fixed backbone network.

The Broadband Wireless Internet Forum ("BWIF") has created a standard for the provision of fixed broadband wireless. The standard involves the use of a Wireless Access Termination System ("WATS") to broadcast information to a group of subscribers on a downstream channel. The subscribers send information to the WATS using a shared upstream channel. Each subscriber is allocated access to a channel in accordance with a Medium Access Protocol ("MAC").

A limitation of the BWIF specification is that the subscribers communicate on the upstream channel using the same modulation and encoding schemes. The characteristics of the upstream channel can vary depending on the location of an individual subscriber. Therefore, use of a modulation and encoding scheme that is appropriate for certain channel conditions can unnecessarily impact on the Quality of Service ("QoS") experienced by individual subscribers. If a modulation scheme is chosen to provide high throughput in a channel with high Signal to Interference plus Noise Ratio ("SINR"), then subscribers in locations where the upstream channel has a low SINR will experience very high Bit Error Rates ("BER"). Alternatively, if a modulation scheme is chosen to provide low BERs in a channel with a low SINR, then subscribers in locations where the upstream channel has a high SINR can experience sub-optimal throughput. This problem can be overcome by allowing individual subscribers to transmit using a modulation scheme that continually adapts to the channel conditions experienced by the subscriber in order to provide near optimal throughput for those channel conditions.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

FIGS. 5A and 5B are flow diagrams illustrating steps performed by a wireless access termination system to decide which encoding scheme and symbol constellation a subscriber should use to transmit on an upstream channel;

FIG. 6 is a graph that generally illustrates different characteristics of an additive white Gaussian noise channel, a Ricean channel and a Reyleigh fading channel;

Figure 12:
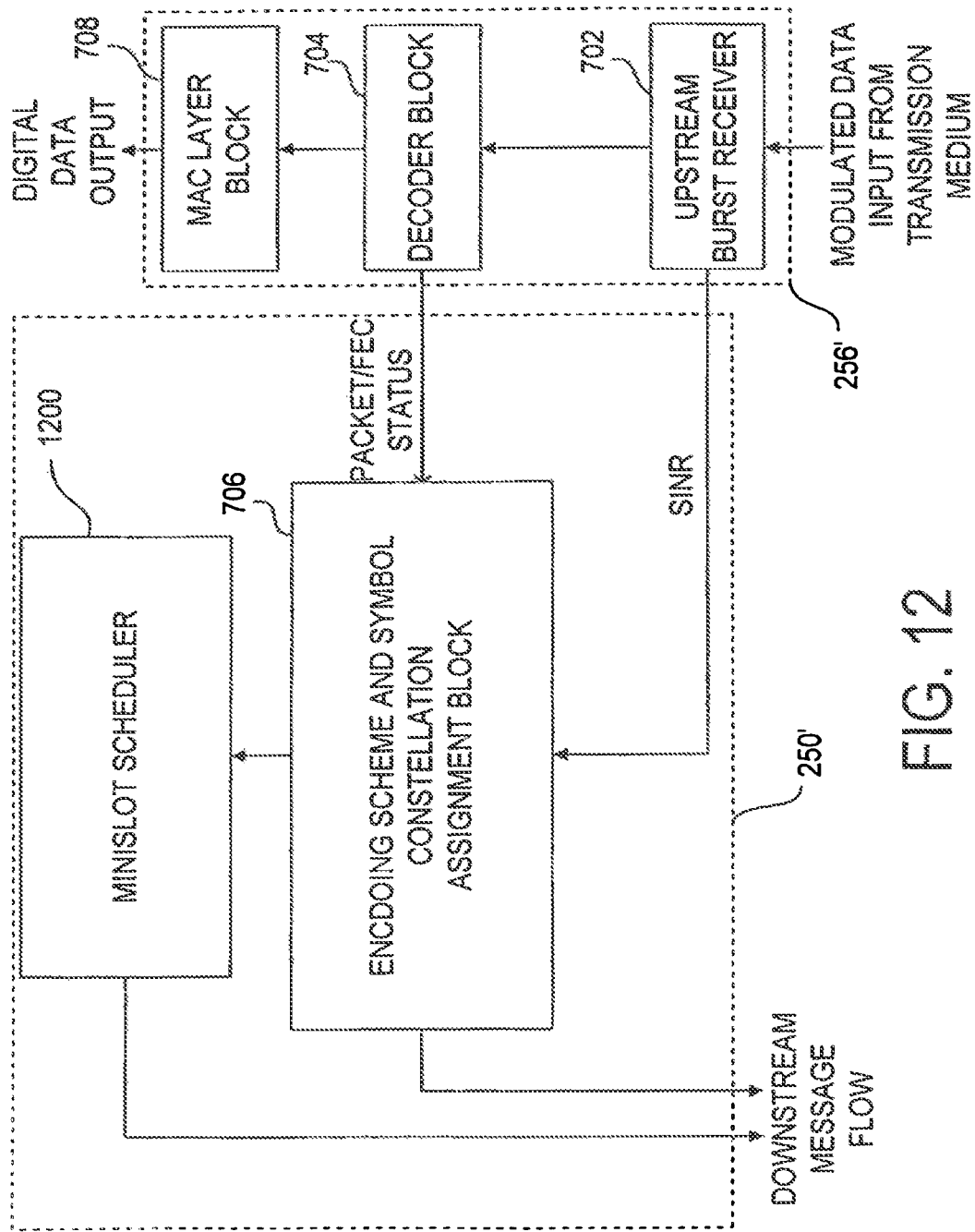
Figure 13:
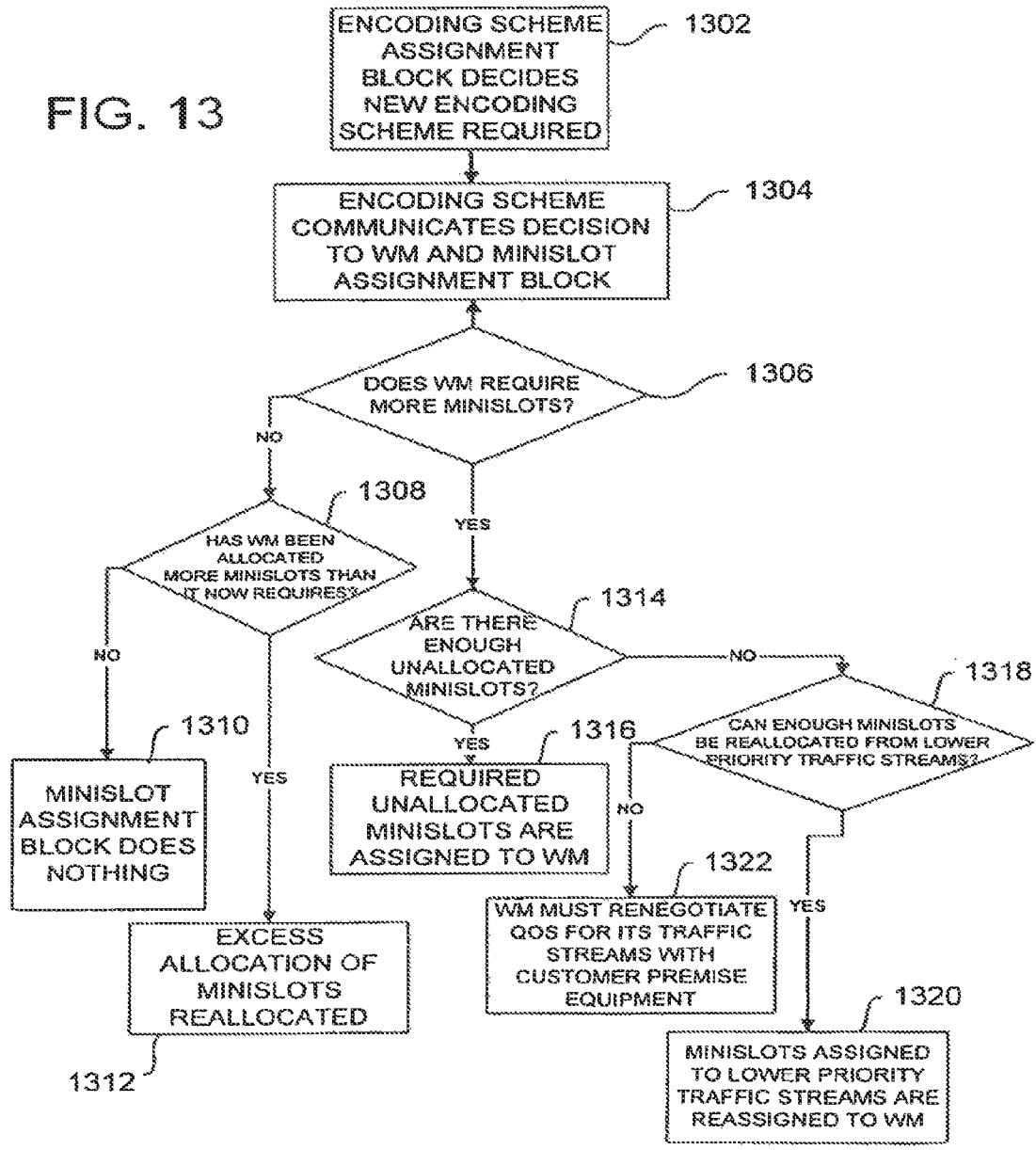

FIG. 12 is a semi-schematic block diagram illustrating components of a wireless access termination system used to determine which encoding scheme and symbol constellation a subscriber should use to transmit on an upstream channel and to allocate timeslots on the upstream channel to subscribers; and FIG. 13 is a flow diagram illustrating the steps performed by a wireless access termination system to allocate timeslots to subscribers, when a subscriber changes encoding scheme and/or symbol constellation.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the present invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although detailed exemplary embodiments of the communication system provided in accordance with practice of the present invention are disclosed herein, other suitable structures for practicing the present invention may be employed as will be apparent to persons of ordinary skill in the art. Consequently, specific structural and functional details disclosed herein are representative only; they merely describe exemplary embodiments of the invention.

Figure 1:
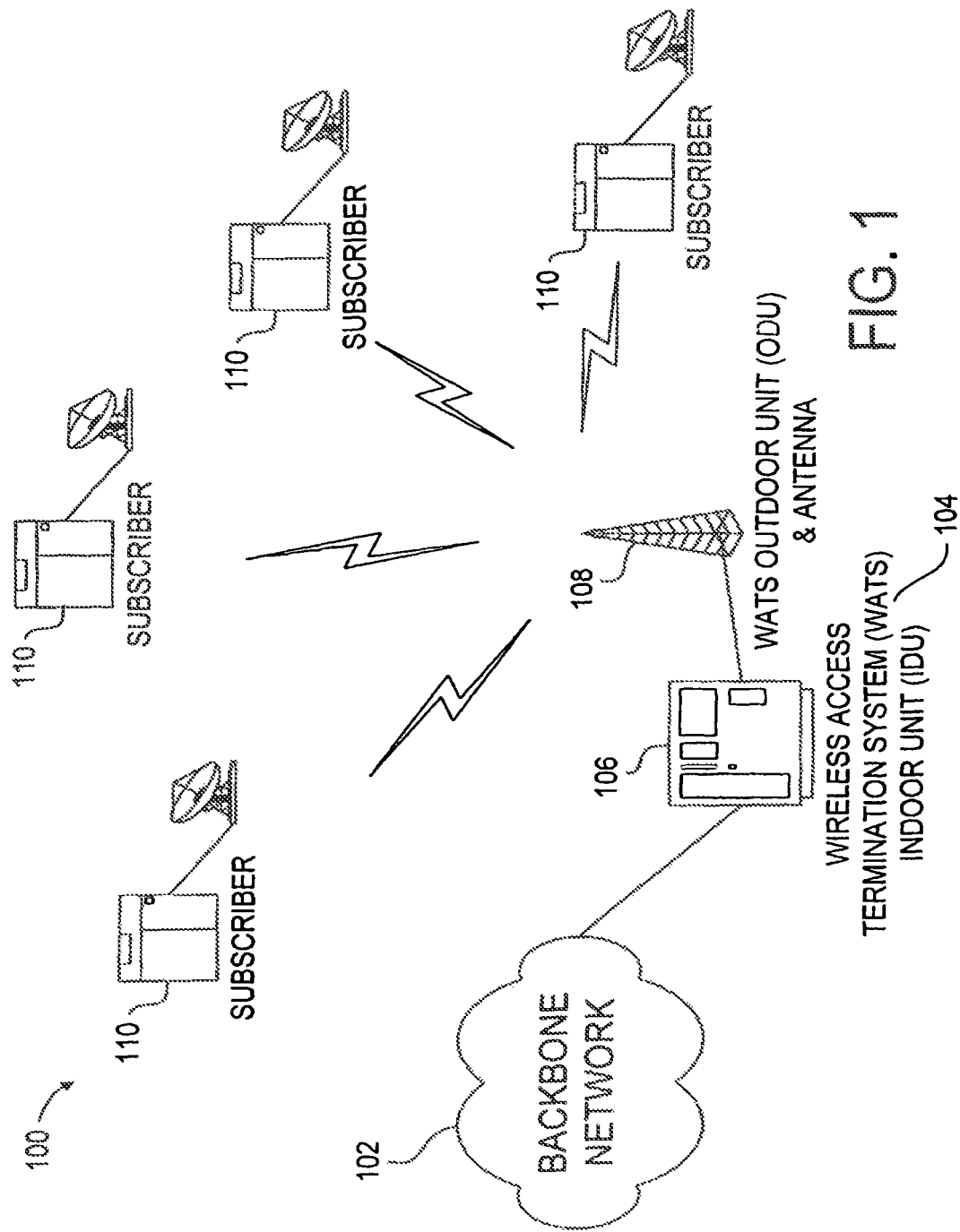
FIG. 1 is a semi-schematic view illustrating a wireless communications network.

Turning to FIG. 1, a communications network 100 in accordance with the present invention is shown. The network 100 includes a backbone network 102 that is terminated by a Wireless Access Termination System ("WATS") 104. The WATS 104 includes an indoor unit ("WATS-IDU") 106 that is connected to an outdoor unit and antenna ("WATS-ODU") 108. The WATS broadcasts data to subscribers 110 on a downstream channel and the subscribers send information to the WATS using a shared upstream channel.

In one embodiment of the network 100, the upstream channel has a spectral bandwidth of between 6 MHz and 15 MHz. The subscribers 110 compete for access to the upstream channel. Therefore, the upstream channel is divided into time slots referred to as minislots. Each minislot is allocated to a subscriber 110, which can transmit information on the upstream channel for the duration of that minislot. Minislots are allocated to subscribers 110 by the WATS 104. Subscribers 110 communicate their bandwidth requirements to the WATS 104 and the WATS assigns minislots to the subscribers based on their bandwidth requirements. The minislot assignments are communicated to the subscribers 110 via broadcast on the downstream channel. In other embodiments, the upstream channel can be further divided into subchannels and each subchannel can have different length minislots. Preferably, the channel is divided into subchannels of one half or one fourth the total channel bandwidth.

Typically, the upstream channel is non-line of sight. Therefore, in one preferred embodiment of the network 100, signals on the upstream channel are transmitted using Vector Orthogonal Frequency Division Multiplexing ("VOFDM"). VOFDM can be used because it is robust in the presence of the severe multipath distortion generally present in high capacity, non-line of sight wireless channels. Instead of sending all of the data on a single very high speed channel that occupies the entire channel bandwidth, VOFDM involves separating the data into a number of separate streams and then transmitting each stream on a separate carrier at a much lower rate. Spectral efficiency is maximized by ensuring that the carriers are spaced so that the signals transmitted on the carriers are orthogonal. The signals transmitted on the carriers are orthogonal when the amplitude of all of the signals at a particular frequency are zero except for the signal being transmitted on that carrier frequency.

Estimation of the upstream channel is achieved by dividing the channel into a total of N carriers or tones, including $N_{data}$ data tones, v training tones and $N_{zero}$ zero tones. The training tones enable the WATS 104 to estimate the characteristics of the upstream channel. Preferably, the training tones are spaced at intervals of N/v, with the first training tone placed at the lower frequency band edge. The zero tones are used to prevent the VOFDM signal interfering with adjacent channels. Preferably, the zero tones are placed in the $N_{zero}/2$ left most and $N_{zero}/2$ right most tones that are not already designated as training tones. The remaining tones are dedicated to the transmission of data. In one embodiment of the communications network 100, N is 512, $N_{data}$ is 396, v is 64 and $N_{zero}$ is 52. In other embodiments more or less training and zero tones can be used.

Figure 2:
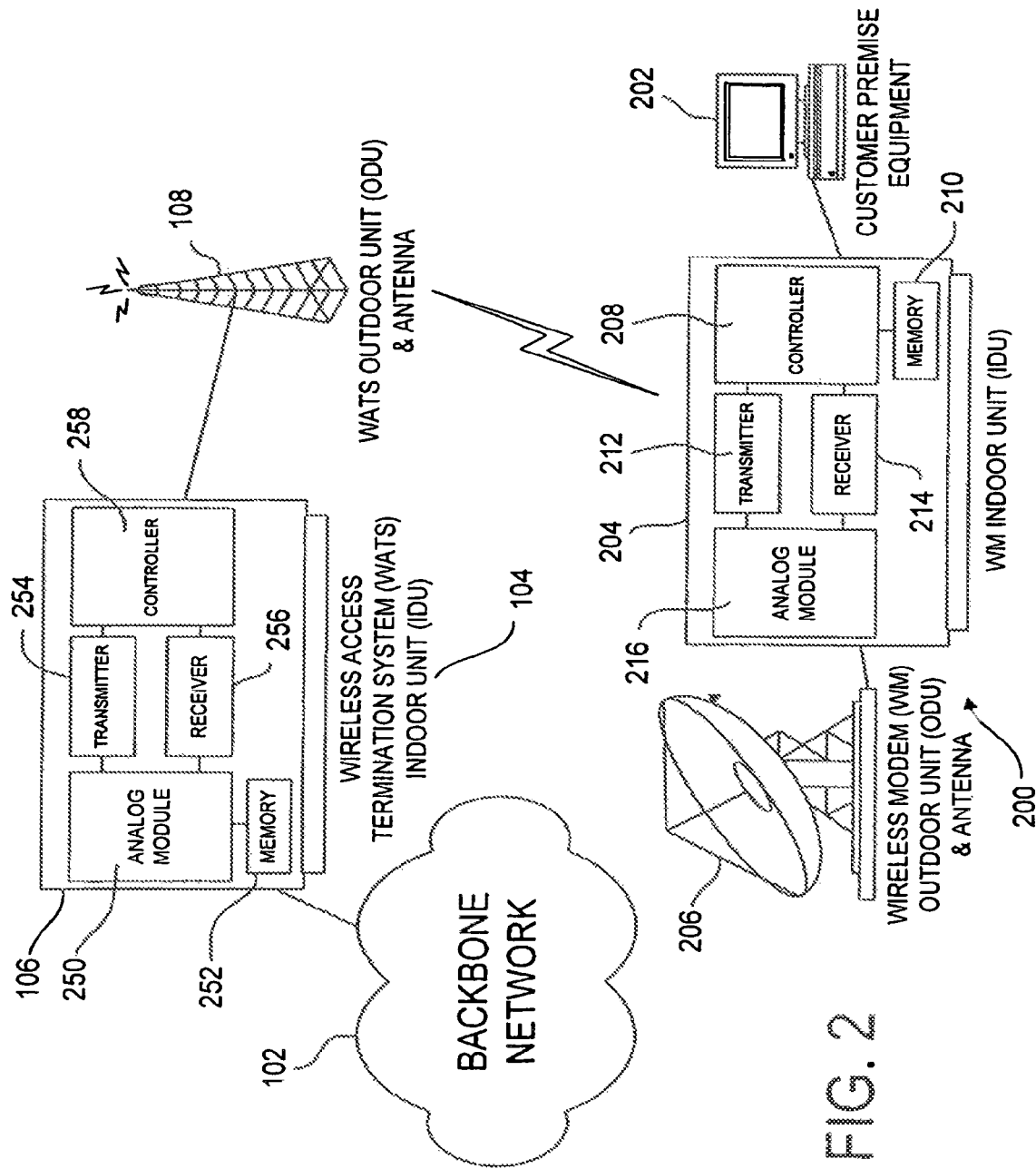
FIG. 2 is a semi-schematic view illustrating a wireless access termination system connected to a backbone network and a wireless modem connected to customer premise equipment at a subscriber location.

The subscriber equipment is illustrated in greater detail in FIG. 2. The subscriber equipment includes a Wireless Modem ("WM") 200 connected to customer premise equipment 202. The WM includes an indoor unit ("WM-IDU") 204 that is connected to an outdoor unit and antenna ("WM-ODU") 206. The WM-IDU comprises a controller 208 and memory 210, which are connected to a VOFDM transmitter 212 and a receiver 214. Both the transmitter 212 and the receiver 214 have digital output and are connected to an analog module 216, which converts the digital output to an analog radio frequency signal for transmission. The controller 208 and memory 210 are connected to the customer premise equipment 202 and the analog module 216 is connected to the WM-ODU 206. Preferably, the WM-ODU 206 comprises an antenna for transmitting and receiving radio frequency signals. More preferably, the WM-ODU 206 comprises multiple antennas for improved reception of the VOFDM signal.

The WM 200 demodulates and decodes data broadcast by the WATS 104 on the downstream channel. It also codes, modulates and transmits data from the subscriber to the WATS 104 on the upstream channel.

Figure 3:
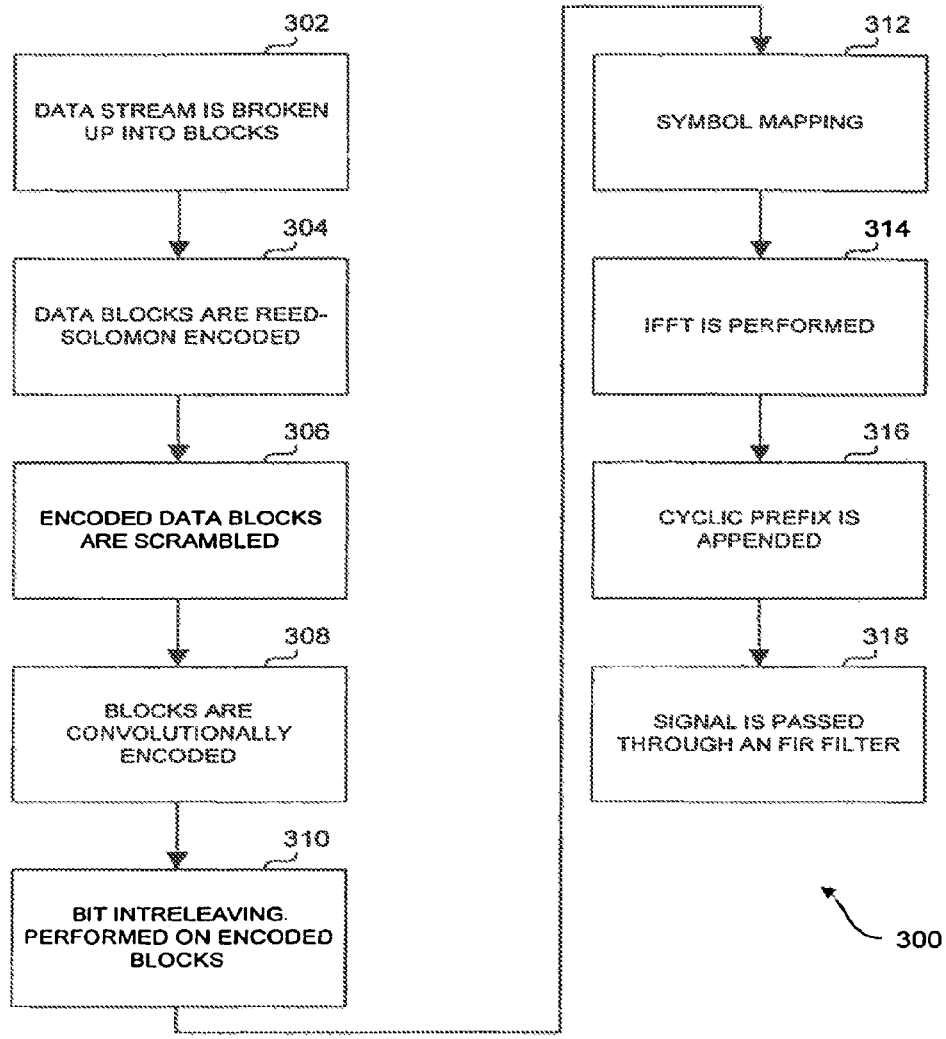
FIG. 3 is a flow diagram illustrating steps performed by a wireless modem to transmit data on an upstream channel.

The functions performed by the WM 200 in encoding and modulating data for transmission are illustrated by the flow chart shown as FIG. 3. The encoding and modulation process begins when the subscriber equipment 202 generates a burst of data for transmission to the WATS 104. The controller 208, then performs the step 302 of dividing the data into blocks, where each block represents the amount of data to be transmitted in a single VOFDM burst.

The data blocks are encoded using an error correcting encoding on the transmitter 212 in the step 304. The error correcting encoding enables the WATS 104 to correct some of the errors that can result during transmission. In one preferred embodiment Reed-Solomon encoding is used. Reed-Solomon encoding is a linear block Forward Error Correction ("FEC") technique which increases the block size by R bytes. The Reed-Solomon encoding enables the WATS to correct up to R/2 byte errors in each encoded data block. In other embodiments of the communications network, other FEC encoding techniques can be used.

The encoded data is then scrambled by the transmitter 212 in the step 306, which reduces the probability of long sequences of ones or zeros being generated. Long sequences of ones or zeros can result in the peak-to-mean power ratio of the transmitted signal being undesirably high.

Following the scrambling, another encoding step 308 is performed by the transmitter 212, which involves the use of a convolutional code. A convolutional code maps k bits of a continuous input stream on n output bits. The convolutional encoding reduces the probability that bit errors will occur. In one embodiment of the transmitter, the convolutional encoder is composed of two components. The first is a standard length—7, rate—½ convolutional encoder, utilizing a standard pair of generator polynomials (171, 133). The second is a standard puncturing module with patterns for producing coding rates of ⅔ and by deleting bits from the output of the rate ½ encoder. Each block is encoded independently, therefore, the data is fully flushed from the encoder between bursts. This is done by feeding six 0 bits into the encoder.

Following the convolutional encoding, the transmitter 212 performs the bit interleaving step 310. The bit interleaving ensures that narrowband interference which can corrupt several adjacent data tones does not degrade the performance of communications on the upstream channel. When the data transmitted on the affected data tones is de-interleaved at the WATS 104, the errors are spread throughout the data stream. Spreading the errors increases the likelihood that FEC encoding can be used to correct the errors. A large number of errors in a small number of data blocks can result in those data blocks being lost despite the FEC encoding. However, if the same number of errors are spread over a larger number of data blocks, then there is a greater likelihood that the FEC encoding can be used to correct the errors so that none of the data blocks will be lost.

The interleaved bits are mapped to symbols in the step 312 by the transmitter 212. The symbols chosen depend on the modulation scheme being used by the WM 200. In one embodiment, the WM 200 is capable of transmitting using Quadrature Phase Shift Keying ("QPSK"), 16 Quadrature Amplitude Modulation ("16-QAM") or 64-QAM. In other embodiments, the WM can be configured to provide a greater variety of modulation techniques.

Following the symbol mapping, the transmitter 212 inserts training and zero tones and then performs an Inverse Fast Fourier Transform ("IFFT") 314. The IFFT ensures that the transmitted signals are orthogonal. The complex baseband OFDM signal is the inverse Fourier transform of the N QAM input symbols. An IFFT is used to reduce the number of calculations required to generate the baseband VOFDM signal.

Following the IFFT, the transmitter 22 performs the step 316 of adding a cyclic prefix to the IFFT output to ensure orthogonality of the transmitted signals in the presence of a timing offset.

Finally, the step 318 of FIR filtering is performed. The FIR filtering filters out reflections and provides spectral shaping to increase spectral efficiency. The transmitter 212 uses a frequency controlled oscillator to shift the complex filtered output to a desired Intermediate Frequency ("IF") and discards the imaginary portion of the signal to provide a real, two-sided signal capable of being applied to a digital to analog converter in the analog module 216.

Figure 4:
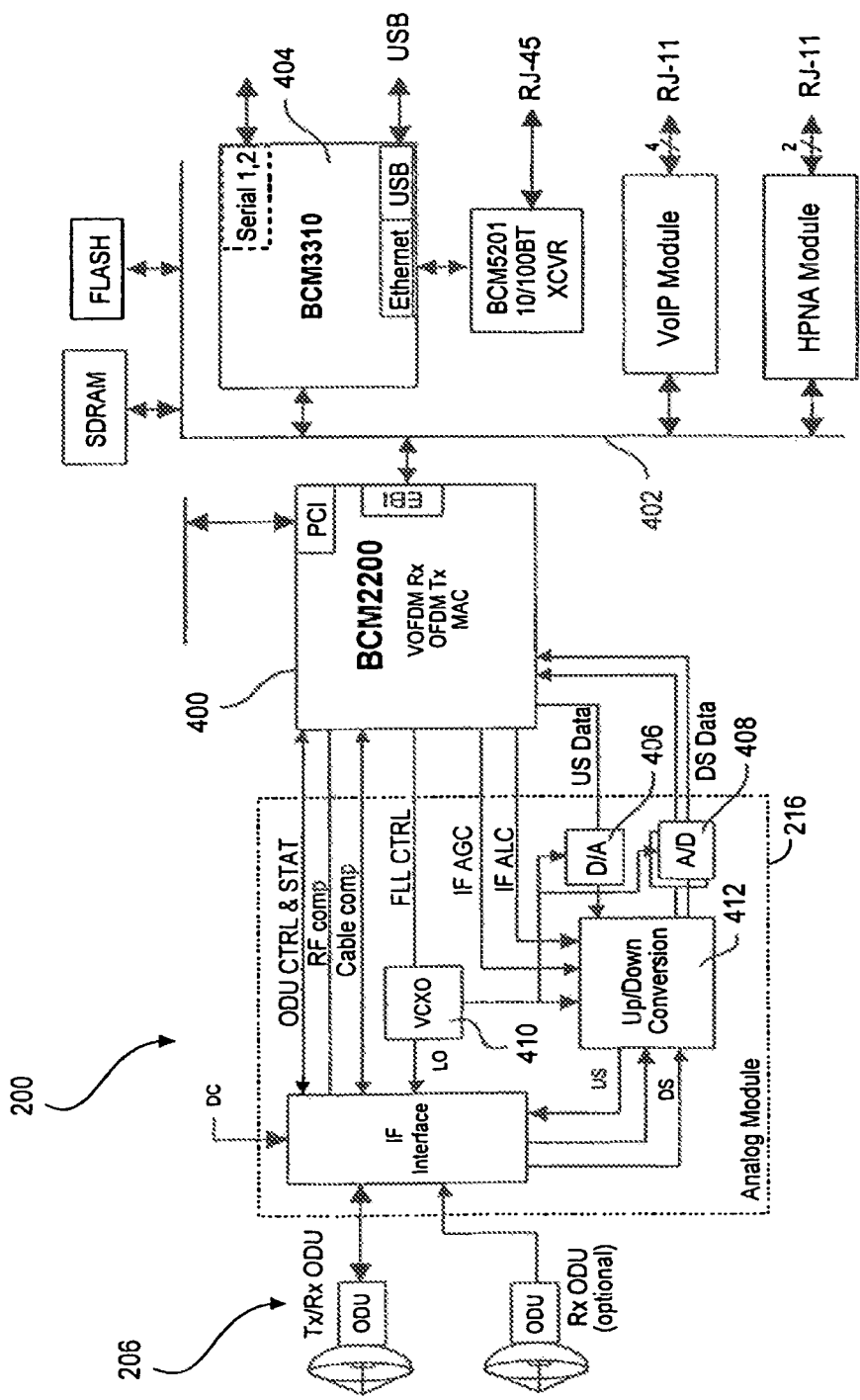
FIG. 4 is a semi-schematic circuit diagram of a wireless modem.

In one embodiment of the WM 200, shown in FIG. 4, the transmitter and receiver are implemented using a BCM2200 integrated circuit 400 manufactured by Broadcom Corporation of Irvine, Calif. The BCM2200 is connected to the memory and controller by a bus 402. The controller is implemented using a BCM3310 communications processor 404 manufactured by Broadcom Corporation. The BCM2200 is also connected to the analog module 216. The analog module 216 is implemented using discrete components in a manner well known in the art and comprises a digital to analog converter 406 for the upstream channel, an analog-to-digital converter 408 for the downstream channel, a local voltage controlled oscillator 410 for shifting between the IF and the transmission frequency and filters 412 for selecting the upstream or downstream channel signal and for removing reflections and distortions. Preferably, the upstream and downstream channel frequencies are located within the U.S. MMDS Band (2.500-2.686 GHz) of the RF spectrum. Although, in other embodiments, the upstream and downstream channel frequencies are located with the U.S. MDS Band (2.150-2.162 GHz), the unlicensed UNII Band or the European Fixed Wireless Band.

Referring again to FIG. 2, a closer inspection reveals that the WATS-IDU 106 comprises a controller 250 and memory 252 connected to a transmitter 254 and a VOFDM receiver 256. In addition, both the transmitter 254 and receiver 256 are connected to an analog module 258. The controller is connected to the backbone network 102 and the analog module is connected to the WATS-ODU 108.

The WATS 104 demodulates and decodes data broadcast by the WM 200 on the upstream channel. It also codes, modulates and transmits data from the backbone network 102 to the subscriber 110 on the downstream channel.

The performance of communications on a channel can be quantified using certain metrics such as Signal to Interference plus Noise Ratio ("SINR"), Bit Error Rate ("BER"), Codeword Error Rate ("CER"), Symbol Error Rate ("SER"), number of corrected bit errors, number of corrected codeword errors, the metrics within a Viterbi decoder, the Ricean K factor or other similar measurements. Typically, in a communications network a set of minimum requirements is defined for transmission on a channel. These requirements establish values for some or all of the above metrics that must be maintained at all times. In one preferred embodiment of the communications network 100, the only requirement specified is that the CER must remain below $10^{-7}$. However, in other embodiments different minimum requirements involving higher or lower tolerances or the use of different combinations of metrics can also be required.

As previously discussed, the encoding and modulation scheme required to satisfy the above minimum requirement varies depending on the quality of the channel where a particular subscriber 110 is located. In one embodiment of the network 100, the symbol rate is fixed for each channel. However, individual subscribers 110 are able to transmit using different encoding schemes and symbol constellations.

In accordance with practice of the present invention, the encoding scheme and symbol constellation used by a subscriber is controlled by the WATS 104. When the WATS 104 receives a signal from a subscriber 110, the WATS measures the quality of the signal and directs the subscriber to adopt a new encoding scheme and/or symbol constellation if the subscriber is not optimally utilizing the channel. In this way, subscribers 110 that experience a high quality upstream channel are able to achieve higher throughputs than subscribers 110 that experience a low quality upstream channel and all subscribers 110 are able to satisfy the minimum requirements for transmission on the upstream channel.

FIG. 5A illustrates a process used by a WATS 104 to allocate an encoding scheme and symbol constellation to a subscriber 110. The WATS 104 measures the quality of the received signal transmitted by the subscriber 110 on the upstream channel in the step 502. The WATS 104 then performs the step 504 of determining the optimal encoding scheme and symbol constellation for the transmission of signals on a channel with the quality of the measured quality of the upstream channel. If the optimal encoding scheme and symbol constellation is determined to be different to the encoding scheme and symbol constellation being used by the subscriber 110 in the step 506, then the WATS 104 instructs the subscriber to change encoding scheme and/or symbol constellation to the optimal encoding scheme and symbol constellation in the step 508. If the encoding scheme and symbol constellation being used by the subscriber 110 is the same as the optimal encoding scheme and symbol constellation, then the WATS 104 allows the subscriber to continue to transmit using that encoding scheme and symbol constellation 510.

The steps 502 and 504 of FIG. 5A are shown in greater detail in FIG. 5B. FIG. 5B shows a process that can be used to determine the optimal encoding scheme and symbol constellation for transmission of signals on a channel with the quality of the measured quality of the upstream channel. The WATS performs the step 502 of measuring the quality of the received signal from the subscriber 110, then the WATS compares the measured quality of the channel to a set of lower thresholds for the use of the encoding scheme and symbol constellation being utilized by the subscriber in the step 550. If the thresholds are not satisfied then the WATS 104 performs the step 552 of selecting a more robust encoding scheme and/or a smaller symbol constellation and then repeating the step 550. Comparing the measured signal quality to the lower threshold for use of the selected encoding scheme and symbol constellation. When an encoding scheme and symbol constellation is found for which the measured channel quality satisfies lower thresholds of that encoding scheme and constellation, then the WATS 104 compares the measured quality of the channel to a set of upper thresholds for use of that encoding scheme and symbol constellation in the step 554. If the thresholds are not satisfied, then the WATS selects a less robust encoding scheme and/or a larger symbol constellation in the step 556 and then repeats the step 554 comparing the measured signal quality to the upper threshold for use of the selected encoding scheme and symbol constellation. When an encoding scheme and symbol constellation is found for which the measured quality of the channel satisfies the upper thresholds for that encoding scheme, then the WATS 104 performs the step 558 of selecting that encoding scheme and symbol constellation as the optimal encoding scheme and symbol constellation.

Preferably, the communications network 100 of the present invention is able to predict degradation of the upstream channel and cause subscribers 110 to change encoding schemes and/or symbol constellations prior to the degradation occurring. Predicting degradation enables the communications network 100 to respond before it fails to satisfy the minimum transmission requirements. Any of the metrics mentioned above can be used to measure channel quality, however, there are limitations in their ability to predict channel degradation.

FIG. 6 illustrates the relationship between SINR and the codeword error probability for an Additive White Gaussian Noise ("AWGN") channel, a Ricean channel and a Rayleigh channel. The curve 600 illustrates the relationship between SINR and the codeword error probability for an AWGN channel. The curve 602 illustrates the relationship between codeword error probability for a Ricean channel and the curve 604 illustrates the relationship between codeword error probability for a Rayleigh channel. The line 606 indicates a codeword error probability of $10^{-7}$. A codeword error probability that is less than $10^{-7}$ satisfies the minimum operating requirement for one embodiment of the wireless communications system 100.

Assuming first that the channel is an AWGN channel, then the codeword error probability experienced at the SINR indicated by the line 608 satisfies the minimum transmission requirement. However, a small decrease in SINR results in the probability exceeding the minimum transmission requirement. The absence of a gradual increase in CER renders it difficult for the WATS to predict that the channel is degrading using this metric alone. The same is also true of the relationship between BER and average SFNR (not shown).

FIG. 6 also illustrates that measurement of SINR alone is unlikely to accurately predict channel degradation because the threshold at which the channel degrades is dependent on the type of the upstream channel. When the SINR received at the WATS 104 is as indicated by the line 608, the minimum transmission requirement is met if the channel is an AWGN channel. However, if the channel is either a Ricean channel or a Rayleigh channel, then the minimum transmission requirement is not met. In addition, the average channel SINR is unlikely to predict a decrease in performance arising from strong narrowband interference.

The variance in the SINR or the SER are more useful for detecting narrowband interference. Other metrics can be used for predicting decreases in performance irrespective of the channel type including corrected bit errors, corrected codeword errors, Ricean K-factor and the Viterbi path metrics.

Any of the above metrics can alone or in combination be used to measure the quality of the upstream channel and to predict degradation in its performance. Preferably, the WATS 104 compares the SINR or SER to threshold values in the decision steps 550 and 554 of FIG. 5B. More preferably, the WATS 14 compares the result of the following function to the threshold values.

More preferably again, the WATS 104 compares a number of the above metrics to a set of predetermined thresholds and the WATS 104 requires a change in encoding scheme and/or symbol constellation if any of the thresholds are not satisfied.

Figure 7:
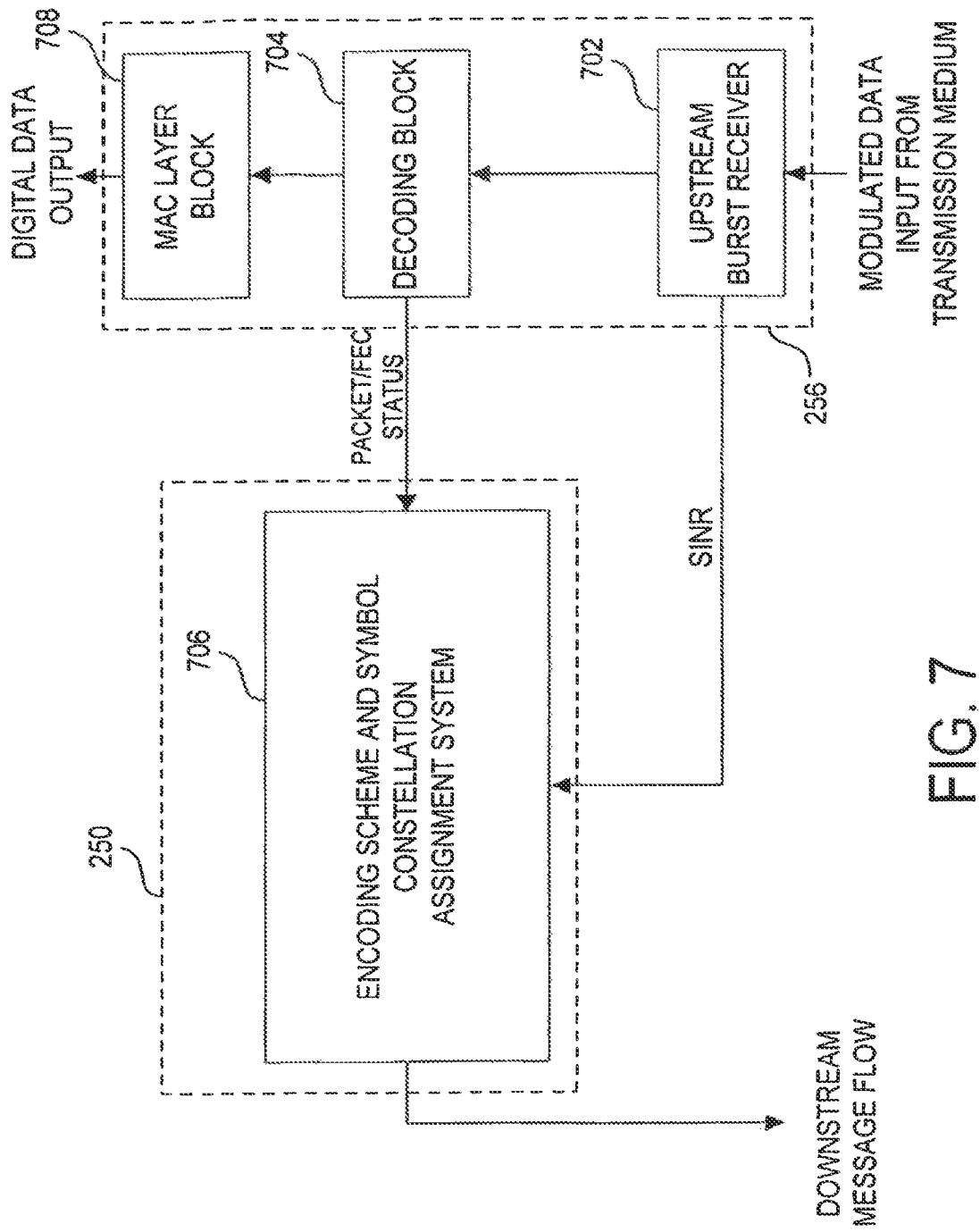
FIG. 7 is a semi-schematic block diagram illustrating components of a wireless access termination system used to determine which encoding scheme and symbol constellation a subscriber should use to transmit on an upstream channel.

The Elements of a controller 250 and receiver 256 used by a WATS 104 to measure channel quality and determine the encoding scheme that a subscriber 110 can use to make optimal use of its allocated transmission time is illustrated in FIG. 7. The receiver 256 comprises an upstream burst receiver 702 connected to a decoding block 704 and an encoding scheme and symbol constellation assignment block 706. The decoding block 704 is also connected to the encoding scheme and symbol constellation assignment block 706 and a MAC layer block 708.

In one embodiment of the WATS 104, a VOFDM burst signal is received at the WATS-ODU 108 and is input to the upstream burst receiver 702. The upstream burst receiver 702 demodulates the VOFDM burst signal and at the same time, measures the SINR for each tone in the signal.

The upstream burst receiver 702 outputs the demodulated data to the decoder block 704. The decoder block converts the symbols to bit representations, then de-interleaves the received bits and performs convolutional decoding. In one embodiment, the convolutional decoding is performed using a digital Viterbi decoder. However, in other embodiments sequential decoders, analog Viterbi decoders or other decoders may be used.

Following the convolutional decoding, the bits are de-scrambled and then the FEC encoding is used to perform forward error correction. In addition to performing these functions, the decoder block 704 obtains statistics associated with the FEC such as the BER, CER, corrected bit errors and corrected codewords.

The decoded data then passes to the MAC layer block 708, which reconstructs the packets and places the received data in memory.

The measurements of SINR, BER and CER provide inputs to the encoding scheme and symbol constellation assignment block 706, which uses these statistics to decide whether the subscriber 110 should change to a more or less robust encoding scheme and/or a smaller or larger signal constellation in accordance with the procedure outlined above.

If the encoding scheme and symbol constellation assignment block 706 determines that the subscriber 110 can use a more efficient encoding scheme, then the encoding scheme and symbol constellation assignment block 706 generates a message to be sent to the subscriber 110 instructing it to change encoding schemes. This message is then transmitted by the WATS 104 on the downstream channel.

In one embodiment of the communications network 100, the efficiency of the process illustrated in FIG. 5 is increased by establishing a set of predetermined encoding scheme and symbol constellation configurations. Each of the predetermined encoding scheme and symbol constellation configurations is designed to satisfy the minimum requirements and provide high throughput for a given range of channel qualities. The WATS 104 can then direct the subscriber 110 to adopt the predetermined encoding scheme and symbol constellation configuration most appropriate for use at the measured channel quality. The predetermined encoding scheme and symbol constellation configurations used in one preferred embodiment of the communications network 100 are shown in TABLE 2.

TABLE 2

Encoding scheme and symbol constellation configurations

| Comb. ID | N | v | $N_{zero}$ | $N_{data}$ | Sym. Const. | R | Conv. |
|---|---|---|---|---|---|---|---|
| I | 128 | 16 | 22 | 90 | 64-QAM | 14 | 0.833 |
| II | 128 | 16 | 22 | 90 | 64-QAM | 14 | 0.667 |
| III | 128 | 16 | 22 | 90 | 64-QAM | 10 | 0.5 |
| IV | 128 | 16 | 22 | 90 | 16-QAM | 10 | 0.5 |
| V | 128 | 16 | 22 | 90 | QPSK | 10 | 0.667 |

Where Comb. ID is the encoding scheme and symbol constellation identifier; N is the number of VOFDM tones; v is the number of training tones; $N_{zero}$ is the number of zero tones; $N_{data}$ is the number of data tones; Symb. Const, is the symbol constellation being used; R is the number bytes added by the Reed-Solomon encoding; and Conv. is the rate of the convolutional encoder.

In one embodiment of the communications network 100, the thresholds at which these different encoding scheme and symbol constellation configurations are used are determined automatically by the WATS 104 using known test transmissions from the subscriber 110.

In another embodiment, a set of thresholds are defined for the minimum SINR required for the encoding scheme and signal constellation configuration to be used. These thresholds are shown in TABLE 3.

TABLE 3

Minimum SINR thresholds

| Comb. ID | SINR threshold |
|---|---|
| I | >21 dB |
| II | >16 dB |
| III | >12 dB |
| IV | >9 dB |
| V | >4 dB |

In other embodiments, thresholds are defined for a number of performance metrics in combination or separately.

In one embodiment of the WATS 104, the transmitter 254 and receiver 256 are implemented using a BCM92210 linecard manufactured by Broadcom Corporation and the controller 250 is implemented using a Pentium microprocessor manufactured by Intel Corporation of Santa Clara, Calif. In other embodiments other transmitters, VOFDM receivers and controllers or microprocessors can be used.

Figure 8:
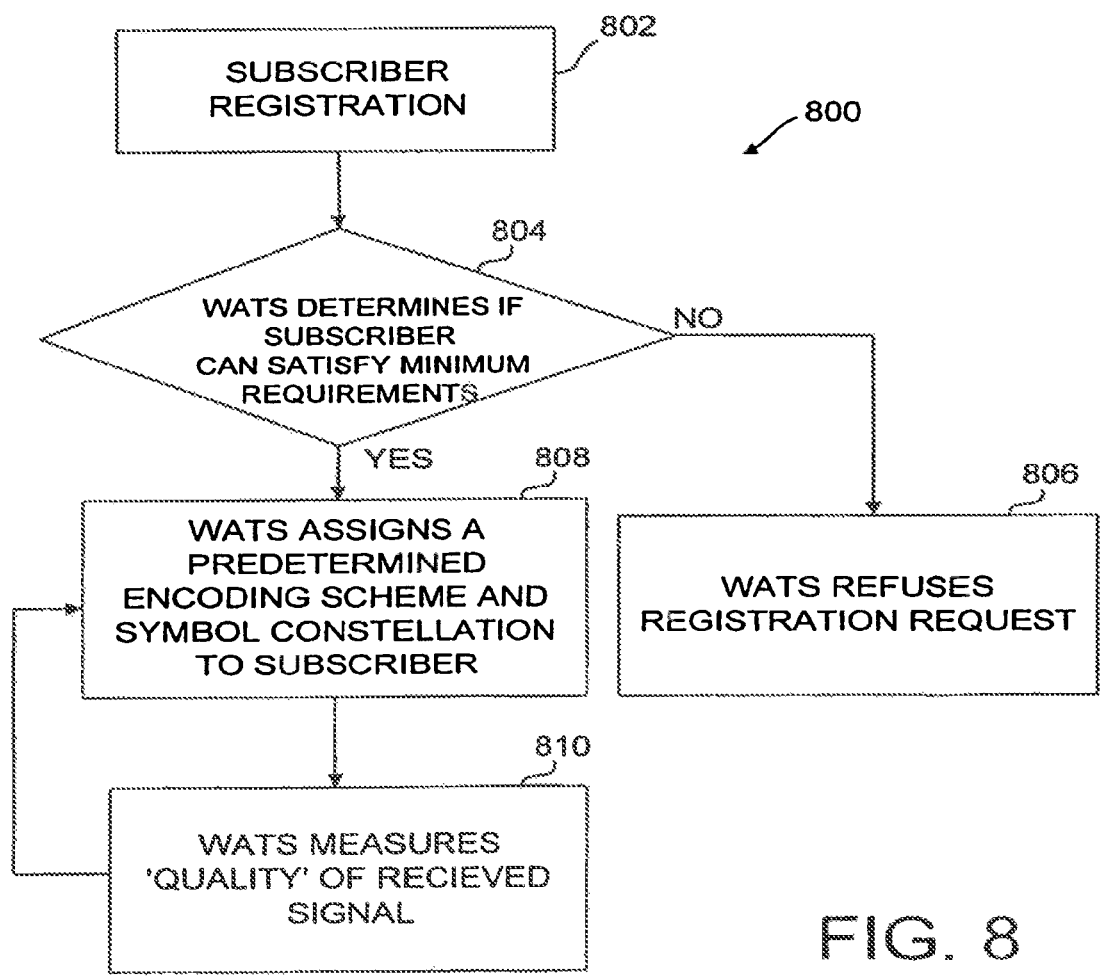
FIG. 8 is a flow diagram illustrating steps used by a wireless access termination system to allocate an encoding scheme and symbol constellation to a subscriber registering with the wireless access termination system.

Turning now to FIG. 8, a process 800 for allocating an encoding scheme and symbol constellation to a new subscriber 110 is illustrated. Initially 802, the subscriber 110 attempts to establish communications or register with the WATS 104 by sending a registration request on the upstream channel. The subscriber 110 attempts to register with the WATS 104 using the most robust of the predetermined encoding scheme and symbol constellation configurations. The WATS 104 receives the registration request transmission and then performs the step 804 of determining if the subscriber can support the minimum requirements for transmission. The WATS 104 completes this step by measuring the characteristics of the received transmission and determining whether they satisfy the minimum requirements. If the minimum requirements are not met, the WATS 104 refuses the registration request 806. A refusal must be made because the subscriber WM 200 cannot transmit using a more robust encoding scheme. Therefore, the subscriber 110 cannot alter the encoding or modulation of the transmission in any way that will cause the minimum requirements to be met.

If the transmission satisfies the minimum requirements, then the WATS 104 performs the step 808 of assigning a predetermined encoding scheme and symbol constellation configurations to the subscriber 110. Once this predetermined encoding scheme and symbol constellation configuration assignment has been completed, future transmissions by the subscriber 110 must use this encoding scheme unless the WATS 104 directs otherwise. The WATS 104 continually monitors the quality of subscriber transmissions 810 and instructs the subscribers 110 to change encoding schemes and/or symbol constellations as required.

Figure 9:
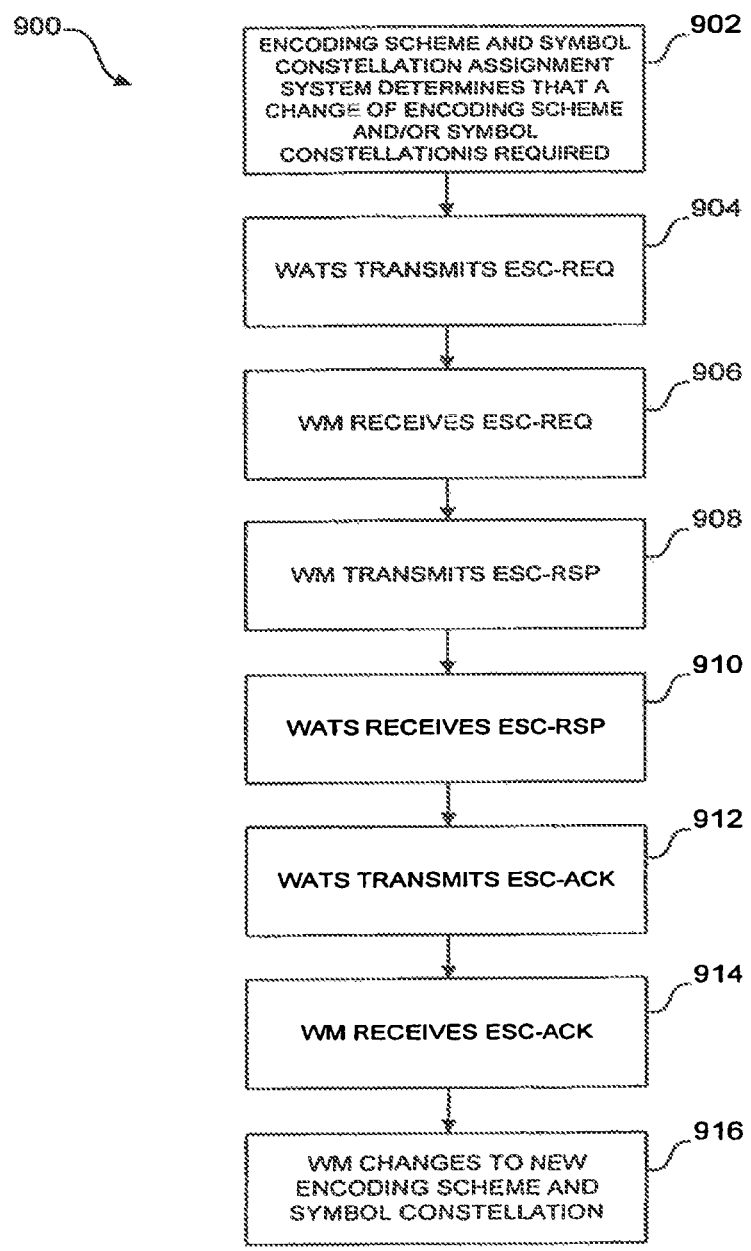
FIG. 9 is a flow diagram illustrating communications between a wireless modem and a wireless access termination system that cause the wireless modem to adopt a new encoding scheme and/or symbol constellation.

A process 900 used in one embodiment of the communications network 100 to change the encoding scheme and symbol constellation sizes being used by a WM 200 is illustrated in FIG. 9. First 902, the encoding scheme and symbol constellation assignment block 706 determines that a change of encoding scheme and/or symbol constellation is required. The WATS 104 then performs the step 904 of transmitting an Encoding and Symbol constellation Change Request ("ESC-Req") to the WM 200. In step 906, the WM 200 receives the ESC-Req. Once the ESC-Req is received, the WM 200 then performs the step 908 of transmitting an Encoding and Symbol constellation Change Response ("ESC-Rsp"). The WATS 104 receives the ESC-Rsp in step 910 and transmits a Encoding and Symbol constellation Change Acknowledgment ("ESC-Ack") in step 912. Once the WM 200 receives the ESC-Ack in step 914, it is then able to perform the step 916 of adopting the new encoding scheme. Once this step is complete, all future transmissions from that subscriber 110 must use the new encoding scheme and symbol constellation unless the WATS 104 specifies otherwise.

Figure 10:
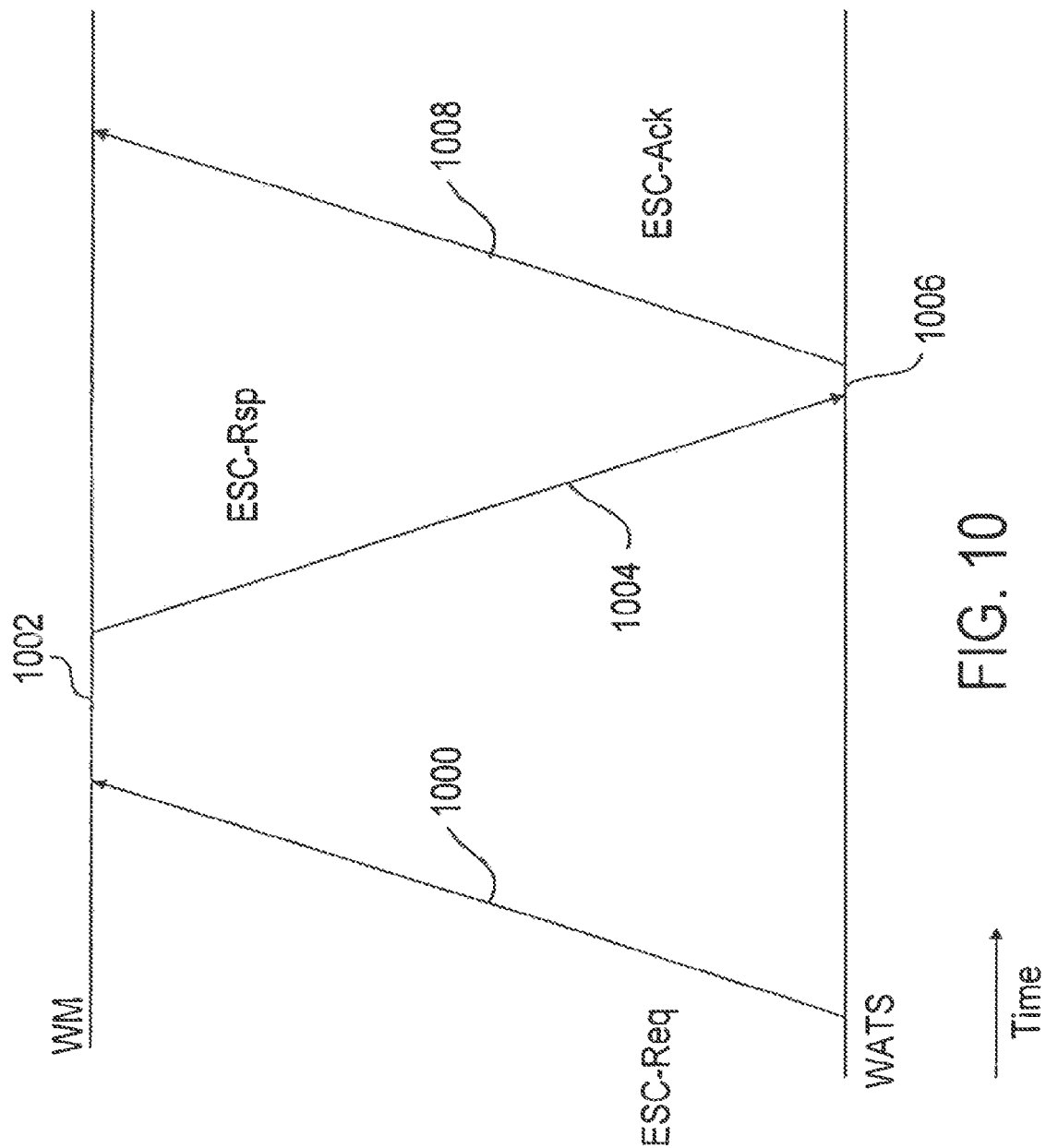
FIG. 10 is a timing diagram illustrating a delay between a decision by a wireless access termination system that a wireless modem should change encoding scheme and/or symbol constellation and the wireless modem changing encoding scheme and/or symbol constellation.

The delay between the decision by the WATS 104 that a subscriber 110 must adopt a new encoding scheme and symbol constellation and the adoption by the subscriber of the new encoding scheme and symbol constellation is illustrated in FIG. 10. The delay is equal to the sum of the ESC-Req transmission time 1000, the WM processing time 1002, the ESC-Rsp transmission time 1004, the WATS processing time 1006 and the ESC-Ack transmission time 1008. The subscriber 110 is unable to transmit data during the period from when the ESC-Req is received by the WM 200 until when the ESC-Ack is received by the WM. Therefore, frequent changes of encoding scheme and/or symbol constellation can reduce WM 200 throughput.

In one embodiment of the communications network 100, the predetermined encoding scheme and symbol constellation configurations are chosen so that the range in channel qualities that the encoding scheme and symbol constellation configurations are designed to be utilized within overlap with each other. This overlapping provides hysteresis, which reduces the frequency with which a subscriber 110 must alter encoding scheme and symbol constellations. Reducing the frequency of changing encoding scheme and/or symbol constellation eliminates the communication overhead associated with these changes and increases throughput by enabling the subscriber 110 to spend more time transmitting data.

The encoding scheme and constellation configurations and the ranges of SINRs in which these configurations can be used for one embodiment of the communications network 100 that incorporates hysteris are shown in TABLE 4.

TABLE 4

SINR ranges for use of encoding scheme
and constellation size configurations

| Comb. ID | Min. SINR | Max. SINR |
| --- | --- | --- |
| I | 21 dB | N/A |
| II | 16 dB | 22 dB |
| III | 12 dB | 17 dB |
| IV | 9 dB | 13 dB |
| V | 4 dB | 10 dB |

The communications network 100 of the present invention transmits different types of traffic, such as voice, data or video traffic. These different types of traffic generally have different Quality of Service ("QoS") requirements. The QoS required by a type of traffic is often determined by the nature of the traffic. Voice traffic has low communication bandwidth requirements but is intolerant to delays or information arriving out of order. The same is also true of video traffic, but video traffic also requires much higher bandwidths. Data transfer has different characteristics. Data transfer usually occurs in bursts involving periods where little bandwidth is required. Delay and order are largely irrelevant in data transfers, the primary requirement is often speed.

In one embodiment of the communications network 100, the customer premise equipment 202 generates traffic streams and specifies the QoS required for transmission of each traffic stream. Consequently, the network 100 is configured such that the traffic stream is transmitted on the upstream channel if there are sufficient minislots available to guarantee that the QoS requirements will be met.

Figure 11:
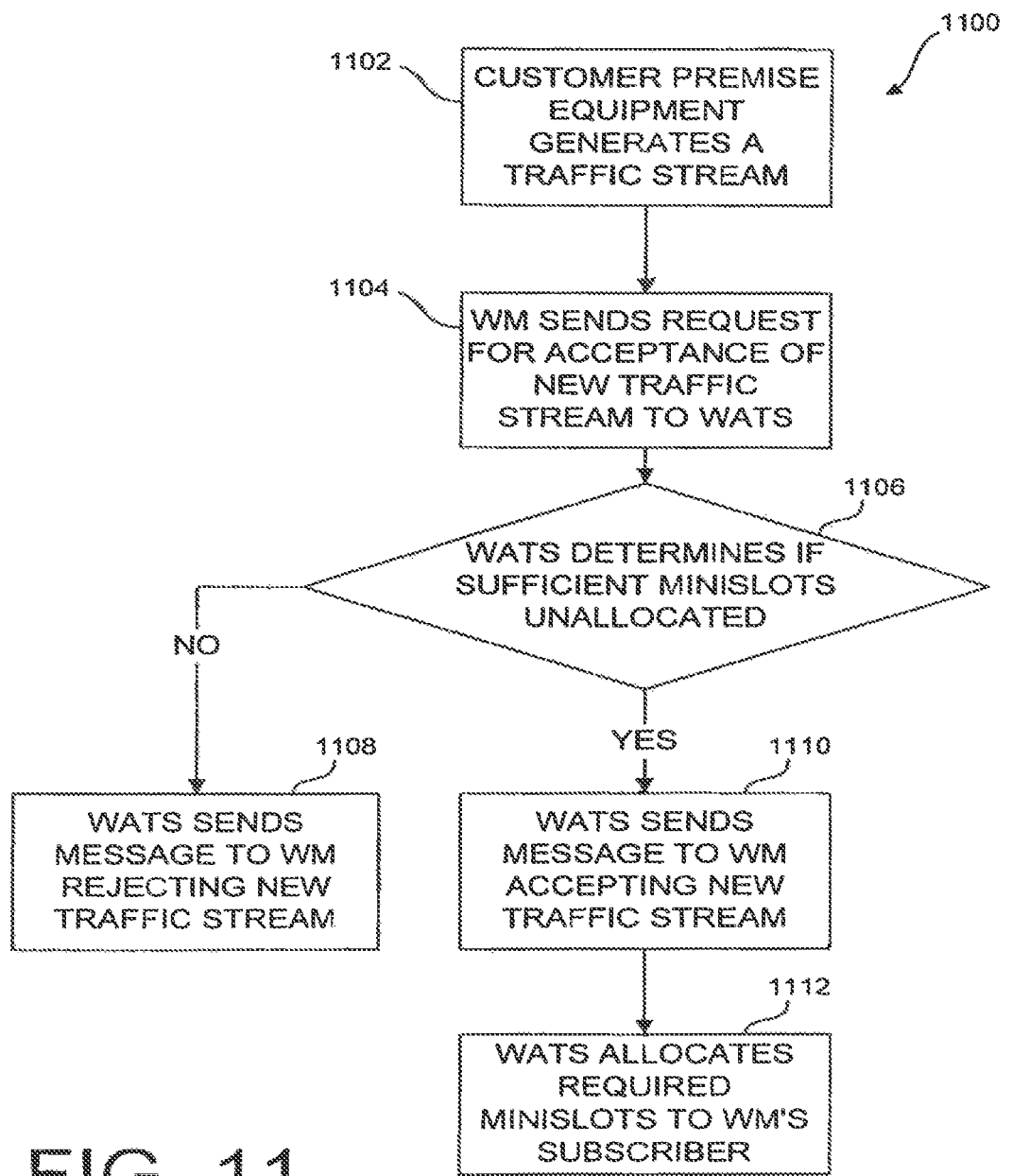
FIG. 11 is a flow diagram illustrating steps performed by a wireless access termination system to allocate transmission timeslots on an upstream channel to subscribers.

A process 1100 used by communications network 100 to determine if the upstream channel can meet the QoS requirements of a new traffic stream is illustrated in FIG. 11. Firstly, the customer premise equipment generates a traffic stream in the step 1102. Prior to commencing transmission of the traffic stream, the WM 200 performs the step 1104 of sending a message to the WATS 104 requesting that the WM 200 be allowed to transmit a new traffic stream on the upstream channel. The message also contains information concerning the QoS required by the new traffic stream. The WATS 104 then is faced with the decision 1106 of determining if it can allocate sufficient minislots to the WM 200 to satisfy the requested QoS requirements.

If the WATS 104 is unable to allocate enough minislots, then it performs the step 1108 of sending a message to the WM 200. The message communicates the WATS refusal to accept transmission of the new traffic stream on the upstream channel. If sufficient minislots are available to satisfy the requested QoS requirements, then the WATS 104 completes steps 1110 and 1112 by sending a message to the WM 200 accepting the new traffic stream and then allocating the required minislots to the WM 200.

The communications network 100 of the present invention supports adaptive encoding and modulation on the upstream channel. Changes in the encoding scheme and/or symbol constellation used by a WM 200 can effect the QoS experienced by the traffic streams that the WM is transmitting. If the WM 200 changes to a more robust encoding scheme and/or a smaller symbol constellation, then its effective data rate on the upstream channel is reduced. Conversely, if the WM 200 changes to a less robust encoding scheme and/or a larger symbol constellation then, the effective data rate of the WM 200 on the upstream channel increases. These changes in effective data rate can effect the QoS experienced by the traffic streams being transmitted by the WM 200. Traffic streams that demand a constant data rate are particularly affected by changes which reduce the effective data rate of the WM 200. If the effective data rate of a WM 200 is reduced by a change in encoding scheme and/or symbol constellation, the WATS 104 can allocate additional minislots to the WM to ensure the QoS requirements of its traffic streams are met. In addition, the WATS 104 can reallocate some of the minislots allocated to that WM 104, when its effective data rate is increased. The minislots can only be reallocated if doing so does not jeopardize the QoS of the WM 200 traffic streams.

Preferably, each traffic stream is assigned a priority. Therefore, if there are insufficient unallocated minislots to guarantee the QoS of all traffic streams, then the WATS 104 can reallocate minislots from traffic streams with low priorities to traffic streams with higher priorities.

An embodiment of a controller 250' and receiver 256' in accordance with practice of the present invention are illustrated in FIG. 12. The receiver 256' is similar to the receiver 256 of FIG. 7 and the controller 250' is similar to the controller 250 of FIG. 7, with the addition of a minislot scheduler 1200 that is connected to the encoding scheme and symbol constellation assignment block 706. The minislot scheduler 1200 maintains a schedule of the minislots assigned to different subscriber traffic streams and the priorities of those streams. The minislot scheduler 1200 also allocates minislots to the WMs 200 and reallocates scheduled minislots, when the upstream channel is congested.

A process 1300 used by the controller 250' for allocating minislots in response to changes in the encoding scheme and/or symbol constellation used by a WM 200 is illustrated in FIG. 13. When the encoding scheme and symbol constellation assignment block 706 determines that a change in encoding scheme is required 1302, it communicates its decision to the WM 200 and the minislot scheduler 1200 in the step 1304. The minislot scheduler 1200 then performs the step 1306 of determining whether the WM 200 has been allocated sufficient minislots to meet the QoS requirements of the traffic streams the WM is transmitting at that time.

If the WM 200 has been allocated sufficient minislots to meet the QoS requirements of the traffic streams it is transmitting, then the minislot scheduler 1200 must make a decision 1308. This decision requires the minislot scheduler 1200 to determine if the current minislot allocation of the WM 200 is in excess of the number of minislots required to meet the QoS requirements of the traffic streams being transmitted by the WM 200. If the current minislot allocation is not in excess of the number of minislots required to meet the QoS requirements of the traffic streams being transmitted by the WM 200, then the minislot scheduler 1200 does nothing 1310. If the WM 200 has been allocated an excess of minislots, then the minislot scheduler 1200 causes a message to be sent to the WM informing it that the excess minislots are no longer assigned to it. The minislot scheduler 1200 is then free to allocate these minislots to other traffic streams as required.

If the WM 200 has not been allocated with sufficient minislots to meet the QoS requirements of the traffic streams it is transmitting, then the minislot scheduler makes the decision 1314 whether there are enough unallocated minislots to meet the requirements of the WM following the change in encoding scheme. If there are sufficient unallocated minislots, then the minislot scheduler 1200 allocates the minislots to the WM 200 and causes a message to be sent to the WM informing it of the new minislot allocation.

If there are insufficient unallocated minislots to meet the QoS requirements of the traffic streams being transmitted by the WM 200, then the minislot allocation system determines in the step 1318 if the minislot requirements of the WM can be met by the reallocation of previously allocated minislots. For the minislot requirements of the WM 200 to be met in this way, the traffic streams being transmitted by the WM must have higher priority than other traffic streams on the upstream channel. If this is the case, then the required minislots are assigned to the WM 200 in the step 1320 by reallocating minislots assigned to lower priority traffic streams.

If there are insufficient minislots allocated to lower priority traffic streams to meet the requirements of the WM 200, then the minislot scheduler causes a message to be sent to the WM informing it that there are insufficient minislots available. The WM 200 must then perform the step 1322 of negotiating new QoS requirements for its traffic streams with the customer premise equipment 202.

While the above description contains many specific features of the invention, these should not, be construed as limitations on the scope of the invention, but rather as an example of one preferred embodiment thereof. Many other variations are possible. Accordingly, the scope of the invention should be determined not by the embodiments illustrated, but by the appended claims and their legal equivalents.

CONCLUSION

It is to be appreciated that the Detailed Description section, and not the Abstract section, is intended to be used to interpret the claims. The Abstract section may set forth one or more, but not all exemplary embodiments, of the present invention, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A method for allocating bandwidth to a subscriber, comprising:

allocating a current bandwidth allocation to the subscriber for transmitting a traffic stream that is encoded using a first set from among a plurality of sets of encoding schemes and symbol constellations, the current bandwidth allocation being sufficient to meet quality of service (QoS) requirements for the traffic stream that are provided by the subscriber;

determining if the current bandwidth allocation is sufficient to meet the QoS requirements for the traffic stream that are provided by the subscriber for a second set from among the plurality of sets of encoding schemes and symbol constellations if used for transmitting the traffic stream;

instructing the subscriber to change its encoding scheme and symbol constellation to the second set when the current bandwidth allocation meets the QoS requirements for the traffic stream that are provided by the subscriber; and receiving the traffic stream that is encoded using the second set from the subscriber.

2. The method of claim 1, wherein the determining further comprises:

determining if the current minimum bandwidth allocation is greater than a bandwidth required to meet the QoS requirements for the traffic stream that are provided by the subscriber; and re-allocating excess bandwidth from among the current bandwidth allocation that is not required to meet the QoS requirements for the traffic stream that are provided by the subscriber to other subscribers.

3. The method of claim 1, wherein the allocating comprises:

allocating time slots to the subscriber for transmitting the traffic stream.

4. The method of claim 3, wherein the allocating time slots to the subscriber comprises:

allocating minislots to the subscriber for transmitting the traffic stream.

5. The method of claim 1, wherein the instructing comprises:

measuring a quality of the traffic stream;

determining the second set based upon the quality of the received traffic stream;

instructing the subscriber to change its encoding scheme to the encoding scheme from the second set when its encoding scheme differs from the encoding scheme from the second set when the current bandwidth allocation meets the QoS requirements for the traffic stream that are provided by the subscriber; and instructing the subscriber to change its symbol constellation to the symbol constellation from the second set when its symbol constellation differs from the symbol constellation from the second set when the current bandwidth allocation meets the QoS requirements for the traffic stream that are provided by the subscriber.

6. The method of claim 1, wherein at least one of the sets of encoding schemes and symbol constellations utilizes as its respective encoding scheme one of:

Reed-Solomon encoding configured to correct a number of byte errors per codeword; or a convolutional encoding of a rate.

7. The method of claim 1, wherein at least one of the sets of encoding schemes and symbol constellations utilizes as its respective symbol constellation one of:

Quadrature Phase Shift Keying (QPSK);
16 Quadrature Amplitude Modulation (16-QAM); or
64 Quadrature Amplitude Modulation (64-QAM).

8. An apparatus for allocating bandwidth to a subscriber, comprising:

a scheduler configured to allocate a current bandwidth allocation to the subscriber for transmitting a traffic stream that is encoded using a first set from among a plurality of sets of encoding schemes and symbol constellations, the current bandwidth allocation being sufficient to meet quality of service (QoS) requirements for the traffic stream that are provided by the subscriber;

an encoding scheme and symbol constellation assignment block configured to:

determine if the current bandwidth allocation is sufficient to meet the QoS requirements for the traffic stream that are provided by the subscriber for a second set from among the plurality of sets of encoding schemes and symbol constellations if used for transmitting the traffic stream, and instruct the subscriber to change its encoding scheme and symbol constellation to the second set of the plurality of sets of encoding schemes and symbol constellations when the current bandwidth allocation meets the QoS requirements for the traffic stream that are provided by the subscriber; and a receiver configured to receive the traffic stream that is encoded using the second set from the subscriber.

9. The apparatus of claim 8, wherein the encoding scheme and symbol constellation assignment block is further configured to:

determine if the current bandwidth allocation meets the QoS requirements for the traffic stream that are provided by the subscriber by determining if the current minimum bandwidth allocation is greater than a bandwidth required to meet the QoS requirements for the traffic stream that are provided by the subscriber, and re-allocate excess bandwidth from the current bandwidth allocation that is not required to meet the QoS requirements for the traffic stream that are provided by the subscriber to other subscribers.

10. The apparatus of claim 8, wherein the current bandwidth allocation is an allocation of time slots to the subscriber.

11. The apparatus of claim 10, wherein the current bandwidth allocation is an allocation of minislots to the subscriber.

12. The apparatus of claim 8, wherein the receiver is further configured to measure a quality of the traffic stream, and wherein the encoding scheme and symbol constellation assignment block is further configured to:

determine the second set based upon the quality of the received traffic stream;

instruct the subscriber to change its encoding scheme to the encoding scheme from the second set when its encoding scheme differs from the encoding scheme from the second set when the current bandwidth allocation meets the QoS requirements for the traffic stream that are provided by the subscriber; and instruct the subscriber to change its symbol constellation to the symbol constellation from the second set when its symbol constellation differs from the symbol constellation from the second set when the current bandwidth allocation meets the QoS requirements for the traffic stream that are provided by the subscriber.

13. The apparatus of claim 8, wherein at least one of the sets of encoding schemes and symbol constellations utilizes as its respective encoding scheme one of:

Reed-Solomon encoding configured to correct a number of byte errors per codeword; or a convolutional encoding of a rate.

14. The apparatus of claim 8, wherein at least one of the sets of encoding schemes and symbol constellations utilizes as its respective symbol constellation one of:

Quadrature Phase Shift Key (QPSK);
16 Quadrature Amplitude Modulation (16-QAM); or
64 Quadrature Amplitude Modulation (64-QAM).

* * * * *